US012718627B2

(12) United States Patent
Kumar et al.

(10) Patent No.: US 12,718,627 B2
(45) Date of Patent: Aug. 25, 2026

(54) DETERMINING A LOCATION OF A DAMAGE APPLIED TO A PARKED VEHICLE

(71) Applicant: Aptiv Technologies AG, Schaffhausen (CH)

(72) Inventors: Vikas Kumar, Gummersbach (DE); Rainer Bunse, Morsbach (DE); Christoph Rott, Cologne (DE); Philipp Botschen, Cologne (DE); Roland Menne, Olpe (DE)

(73) Assignee: Aptiv Technologies AG, Schaffhausen (CH)

( * ) Notice: Subject to any disclaimer, the term of this patent is extended or adjusted under 35 U.S.C. 154(b) by 150 days.

(21) Appl. No.: 18/350,506

(22) Filed: Jul. 11, 2023

(65) Prior Publication Data

US 2024/0021026 A1 Jan. 18, 2024

(30) Foreign Application Priority Data

Jul. 12, 2022 (EP) .................................... 22184519

(51) Int. Cl.
*G07C 5/00* (2006.01)
*G07C 5/08* (2006.01)

(52) U.S. Cl.
CPC ........... *G07C 5/006* (2013.01); *G07C 5/0808* (2013.01); *G07C 5/085* (2013.01)

(58) Field of Classification Search
None
See application file for complete search history.

(56) References Cited

U.S. PATENT DOCUMENTS

| | | | | |
|---|---|---|---|---|
| 9,019,092 | B1 * | 4/2015 | Brandmaier | B60R 21/0136 340/436 |
| 9,592,765 | B2 * | 3/2017 | Dobra | B60Q 9/008 |
| 10,363,796 | B2 | 7/2019 | Decia et al. | |
| 10,417,911 | B2 | 9/2019 | Herman et al. | |
| 10,604,096 | B2 * | 3/2020 | Niemann | B60R 25/102 |
| 10,846,322 | B1 | 11/2020 | Ghamsari et al. | |
| 2006/0232052 | A1 * | 10/2006 | Breed | B60R 21/013 280/735 |

(Continued)

FOREIGN PATENT DOCUMENTS

| | | |
|---|---|---|
| CN | 109218682 | 1/2019 |
| CN | 109922136 | 6/2019 |

(Continued)

OTHER PUBLICATIONS

He, J., Yang, L., Sun, X., & Hu, M. (2018). Damage identification in welded structures using symmetric excitation of Lamb waves. Advances in Mechanical Engineering, 10(9), 168781401879481-. https://doi.org/10.1177/1687814018794817 (Year: 2018).*

(Continued)

*Primary Examiner* — Kito R Robinson
(74) *Attorney, Agent, or Firm* — Harness, Dickey & Pierce, P.L.C.

(57) ABSTRACT

Disclosed are methods for determining the location of a damage applied to a parked vehicle using an acceleration sensor and an ultrasonic sensor provided at an electronic control unit within the interior of the parked vehicle.

18 Claims, 6 Drawing Sheets

(56) References Cited

U.S. PATENT DOCUMENTS

| | | | | |
|---|---|---|---|---|
| 2008/0012693 | A1* | 1/2008 | Shimomura | B60R 25/102 340/425.5 |
| 2019/0095877 | A1 | 3/2019 | Li | |
| 2020/0286308 | A1 | 9/2020 | Keifer et al. | |
| 2021/0048449 | A1* | 2/2021 | Kim | B60R 21/0132 |
| 2021/0179021 | A1 | 6/2021 | Battlogg | |
| 2021/0183180 | A1 | 6/2021 | Geiger et al. | |
| 2021/0363807 | A1 | 11/2021 | Battlogg | |

FOREIGN PATENT DOCUMENTS

| | | | |
|---|---|---|---|
| CN | 111247566 | A | 6/2020 |
| CN | 111915852 | | 11/2020 |
| CN | 114324577 | | 4/2022 |
| DE | 102016210773 | | 12/2017 |
| DE | 102016216522 | | 3/2018 |
| DE | 102018000925 | | 8/2018 |
| DE | 102017106749 | | 10/2018 |
| DE | 102017106749 | A1 * | 10/2018 |
| DE | 102017213966 | | 2/2019 |
| DE | 102019105535 | | 9/2020 |
| DE | 102020004792 | | 11/2020 |
| EP | 3444785 | | 2/2019 |
| WO | 2013158355 | | 10/2013 |
| WO | 2019233993 | | 12/2019 |
| WO | 202099256 | | 5/2020 |
| WO | 2021180350 | | 9/2021 |

OTHER PUBLICATIONS

Lakhdar, M., Mohammed, D., Boudjemaa, L., Rabia, A., & Bachir, M. (2013). Damages Detection in a Composite Structure by Vibration Analysis. Energy Procedia, 36, 888-897. https://doi.org/10.1016/j.egypro.2013.07.102 (Year: 2013).*

Bandes, A. (2003). Ultrasonics: Industry's Multipurpose Maintenance Technology. Sensor Technology and Design. Sensors Magazine. https://www.uesystems.com/wp-content/uploads/ultrasonics_industry_multipurpose_maintenance_technology-1.pdf?srsltid=AfmBOopGXSboMphZblmA7eliRoM5_yl8iFnE-FbwaNAfbp5MpyQD4HUw (Year: 2003).*

"Extended European Search Report", EP Application No. 22184519.1, Mar. 24, 2023, 11 pages.

"Partial European Search Report", EP Application No. 22184519.1, Dec. 23, 2022, 13 pages.

First Office Action regarding Chinese Patent Application No. 202310841148.7, dated Apr. 18, 2026. Translation provided by Google Translate.

* cited by examiner

DETERMINING A LOCATION OF A DAMAGE APPLIED TO A PARKED VEHICLE

INCORPORATION BY REFERENCE

This application claims priority to European Patent Application No. EP22184519.1, filed Jul. 12, 2022, the disclosure of which is incorporated by reference in its entirety.

BACKGROUND

It is desirable to get the information if and where a damage has been applied to a vehicle, e.g. through a bump, because this information can be stored and/or can be transmitted to the car owner. Further, based on this information certain actions can be initiated such as the activation of a horn, of a video camera and/or of flashlights or the like.

In the prior art methods and devices for detecting a damage applied to a parked vehicle are known. These methods and devices make use of a variety of dedicated sensors and are therefore comparatively sophisticated and expensive.

DE 10 2016 210 773 A1 discloses a method and an apparatus for detecting a damage applied to a vehicle using a first, a second and a third sensor unit. By means of further radar, ultrasonic or lidar sensors or cameras a matching of data can be performed. Further, a fourth sensor unit may be provided in the form of an ultrasonic sensor for sensing further data of the vehicle and/or the environment of the vehicle.

Accordingly, there is a need for a method as described above which is able to provide a reliable and cost-effective determination of a location of a damage.

SUMMARY

The present disclosure provides methods, non-transitory computer readable mediums, electronic control units, and vehicles, including those described in the claims. Embodiments are given in the claims, the description, and the drawings.

In one aspect, the present disclosure is directed at a method of determining the location of a damage applied to a parked vehicle using at least one acceleration sensor and at least one ultrasonic sensor, both sensors provided at an electronic control unit (ECU) within a passengers' cabin of the vehicle. Signals which are output by both sensors are monitored and analyzed via an electronic device. The method comprises: sensing acceleration signals along three perpendicular axes by the acceleration sensor and sensing an ultrasonic signal by the ultrasonic sensor, determining characteristics of the acceleration signals and the ultrasonic signal, and determining where the damage on the vehicle has occurred by evaluating the characteristics of the signals.

The above method makes use of an ECU comprising at least one acceleration sensor and at least one ultrasonic sensor. Such ECUs are commercially available and installed in vehicles for providing an anti-theft function. The disclosed method uses such an ECU that is an anti-theft device for determining and localizing a damage applied to a parked vehicle, such as a bump on the roof, the bumper, the hood, the trunk, the doors or a window of the vehicle.

After acceleration signals have been sensed along three perpendicular axes by the acceleration sensor and an ultrasonic signal has been sensed by the ultrasonic sensor, it is possible to store and evaluate these signals by determining characteristics of the acceleration signals and the ultrasonic signal. For example, it is possible to compare e.g. the amplitudes of the acceleration signals sensed along each axis and to determine along what axis a maximum acceleration amplitude occurs. After determining the maximum ultrasonic amplitude, it is possible to determine the location of a damage, e.g. to determine if a damage on a roof of the vehicle or on another location of the vehicle has occurred. This can for example be done by comparing the maximum acceleration amplitude with a preset acceleration threshold and by comparing the maximum ultrasonic amplitude with a preset ultrasonic threshold.

Since an ECU for anti-theft protection is usually located at or adjacent a roof of the vehicle, the sensors of such ECU are more sensitive to events occurring in the region of the roof as compared to events occurring at other locations of the vehicle. Further, the determination of the axis that has a maximum acceleration amplitude allows to determine the direction of impact. For example, if a bump on the roof of the vehicle occurs, the maximum acceleration amplitude will occur along a vertical axis. Simultaneously, the maximum amplitude of the ultrasonic signal will be higher as compared to damages that occur on other locations. Therefore, if it is for example determined that a maximum acceleration amplitude has occurred along a vertical axis and that a maximum ultrasonic amplitude exceeds a certain preset threshold, it can be determined that a damage on the roof has occurred. On the other hand, if a maximum acceleration amplitude is not sensed along a vertical axis, an impact has occurred along a longitudinal or transverse axis of the vehicle.

By analyzing acceleration signals on the one hand and ultrasonic signals on the other hand and by merging the results of such analysis, it is possible to determine the location of a damage applied on a vehicle by a customary anti-theft device in a vehicle.

In the above method a conventional acceleration sensor and a conventional ultrasonic sensor may be used which form part of an anti-theft ECU for detecting angle-changes of the vehicle, thereby integrating a further functionality in the system. The ECU can be mounted inside the vehicle, e.g. in the overhead console of the vehicle. If a bump is applied to an outer surface of the vehicle, structural vibrations are caused in the vehicle and sensed by the acceleration sensor and the ultrasonic sensor. This allows a signal analysis to automatically determine where an event has occurred that has caused a damage to the vehicle.

According to an embodiment, the characteristics to be determined may comprise at least one of duration, amplitude, frequency, decay time, rise time, slew rate, envelope or prefix of a signal. For example, a time decay of the ultrasonic signal and/or of the acceleration signals may be detected to determine if a damage on metal or on another material has occurred. More specifically, metal has the characteristic to vibrate for a comparatively long time and to transfer energy. Therefore, a signal resulting from a damage on metal shows a relatively long time decay. In contrast thereto, glass and plastic generally absorb vibrations. Therefore, the signals resulting from an impact on these materials show a comparatively small time decay. Similarly, more energy is required to damage a glass. Therefore, a signal resulting from a glass damage shows a time decay behavior that is different from a signal resulting from a damage on metal or plastic.

According to a further embodiment, the amplitudes of the acceleration signals sensed along each axis are compared and an axis that has a maximum acceleration amplitude is determined. If a maximum acceleration amplitude is for example determined along a vertical axis, a damage may have occurred on the roof of the vehicle. This assumption may be further verified by determining a maximum ultrasonic amplitude and by comparing the maximum acceleration amplitude with an acceleration threshold and the maximum ultrasonic amplitude with an ultrasonic threshold. By merging the data it can for example be determined if a damage has occurred on the roof of the vehicle.

According to an embodiment, the thresholds can be preset. According to a further embodiment, the thresholds can be set dynamically depending on further parameters.

If it has been determined that a damage has not occurred on the roof of the vehicle, it is of interest at what specific location the damage has occurred. According to an embodiment, this can be realized by filtering out acceleration signals that have a frequency in the range of 0 to 60 Hz, for example of about 30 to 50 Hz and by evaluating these filtered acceleration signals to determine along what axis a peak of a filtered acceleration signal exceeds a threshold. In this regard, the first peak exceeding a certain threshold can be of specific interest to indicate the direction of an impact. For example, if a positive acceleration is detected in a forward direction, it can be concluded that an impact from a rearward direction has occurred. In this regard, it can be advantageous to evaluate the filtered acceleration signals by detecting a prefix of the peak and by using the prefix to determine a location of the damage. For example, if the first peak of the filtered signal occurs in a negative direction, it can be concluded that an impact initiating the signal was applied along the same axis but in an opposite direction.

According to a further embodiment the maximum amplitude of the ultrasonic signal may be used to determine a damage on a bumper of the vehicle. It has shown that damages on parts that are not located adjacent the roof initiate an ultrasonic signal with a smaller amplitude as compared to damages applied to the roof or to adjacent parts such as doors, trunk or windows. Accordingly, a damage applied to a bumper of a car generates a comparatively small amplitude of the ultrasonic signal. This can be used to distinguish between damages on a bumper and other damages.

According to a further embodiment, the symmetry of a signal can be used to determine the location of a damage. For example, if the peaks of a signal show higher amplitudes in a negative direction, it can be concluded that an impact was applied along the same axis but from a positive direction.

According to an embodiment the axes are oriented in parallel to a longitudinal, a transverse and a height axis of the vehicle. This simplifies the evaluation of the various signals.

According to a further embodiment, exclusively one acceleration sensor and one ultrasonic sensor are used for performing the disclosed method. In this embodiment, no further dedicated sensors are used. Only two types of sensors provided at the ECU for an anti-theft function are used. However, the ECU may be provided with more than one acceleration sensor and/or with more than one ultrasonic sensor. Nevertheless, it may be contemplated to additionally use other sensors to improve the accuracy of the disclosed method, for example a gyroscope or an IMU sensor.

According to a further embodiment an ECU with an acceleration sensor may be used, wherein the sensor does not directly contact an impact surface of the vehicle. The sensor may be placed in a top part of the passengers' cabin, for example at an overhead console of a vehicle or between the headliner and the roof of a vehicle. This allows an inexpensive manufacturing since the sensor does not need to be attached to the vehicle roof or to a part of a chassis of the vehicle.

According to a further embodiment the evaluation of the signals may include a determination of a decay percentage of an amplitude of a signal. The evaluation may also include a determination of a damping characteristic of a signal.

In another aspect, the present disclosure is directed at a non-transitory computer-readable medium including instructions to carry out several or all operations of the method described herein. The computer readable medium may be configured as: an optical medium, such as a compact disc (CD) or a digital versatile disk (DVD); a magnetic medium, such as a hard disk drive (HDD); a solid-state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

According to a further aspect, the present disclosure is directed at an electronic control unit for a vehicle, the electronic control unit comprising at least one acceleration sensor and at least one ultrasonic sensor and being adapted to perform an anti-theft function when mounted at or adjacent at or adjacent a roof of the vehicle, wherein the electronic control unit is adapted to communicate with the above-mentioned computer-readable medium.

The electronic control unit may include a processor, at least one memory and at least one non-transitory data storage. The non-transitory data storage and/or the memory may include a program for instructing the device to perform several or all operations or aspects of the method described herein.

BRIEF DESCRIPTION OF THE DRAWINGS

Exemplary embodiments and functions of the present disclosure are described herein in conjunction with the following drawings, showing schematically in.

DETAILED DESCRIPTION

The present disclosure relates to a method of determining a location of a damage applied to a parked vehicle.

Figure 1:
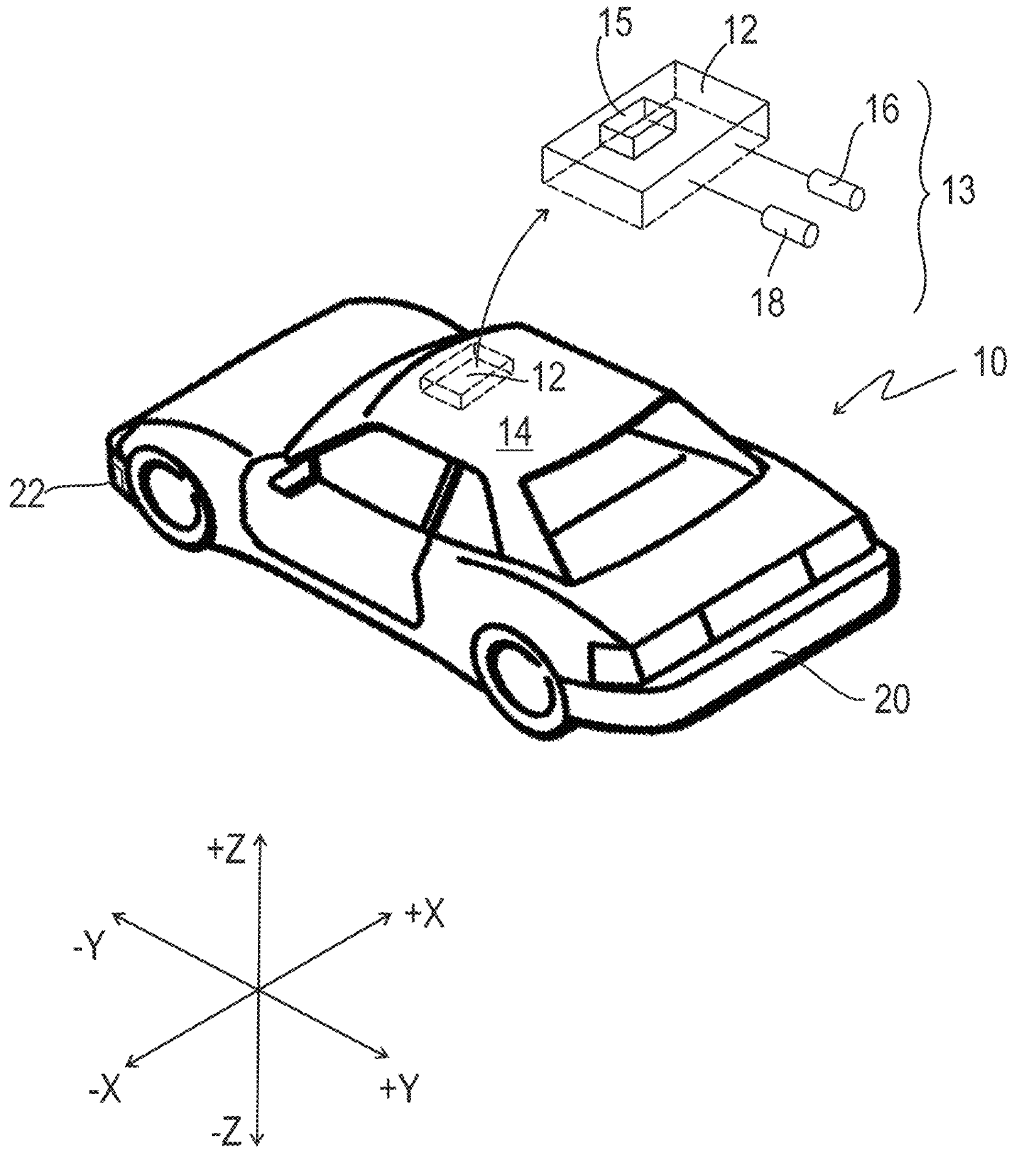
FIG. 1 is a perspective illustration of a vehicle comprising an ECU and a coordinate system defining the axes of an acceleration sensor of the ECU.

FIG. 1 illustrates a parked vehicle 10 that is provided with an electronic control unit 12, ECU, that is located within the interior of vehicle 10, e.g. under a roof 14 of the vehicle 12 at the top of the passengers' cabin adjacent the interior rear view mirror. The ECU 12 that is also shown in greater detail in FIG. 1 is provided with an acceleration sensor 15 within the ECU and an ultrasonic sensor 13 comprising a transmitter 16 and a receiver 18. The ECU and the sensors 13 and 15 are adapted to perform an anti-theft function. In this regard, the ultrasonic sensor 13 serves to detect movements within the interior of the vehicle and the acceleration sensor 15 serves for detecting any changes of an inclination of the vehicle.

The acceleration sensor 15 is adapted to detect accelerations along three perpendicular axes X, Y and Z, wherein these axes are for example defined in correspondence with a longitudinal, a transverse and a height axis of the vehicle 10. In other words, the acceleration axis Y extends along a longitudinal axis of the vehicle 10. The acceleration axis X extends along a transverse direction of the vehicle 10 and the acceleration axis Z extends along a height axis of the vehicle 10. This facilitates to detect the direction of an impact on the vehicle. For example, if an impact on a rear bumper 20 of the vehicle 10 occurs, the acceleration sensor 15 will sense a signal in the negative Y-direction. To the contrary, if an impact on a front bumper 22 of the vehicle occurs, an acceleration in the +Y-direction will be sensed.

According to the disclosed method signals that are output by both sensors 15 and 13 are monitored, eventually stored and analyzed by an electronic device, e.g. located in the ECU. According to the method acceleration signals are sensed by the acceleration sensor 15 along each axis X, Y and Z and an ultrasonic signal is sensed by the ultrasonic sensor 13. Thereafter, the characteristics of the signals are determined and evaluated. For example, amplitudes of the acceleration signals sensed along each axis are compared and it is determined along what axis a maximum acceleration amplitude has shown.

Figure 2:
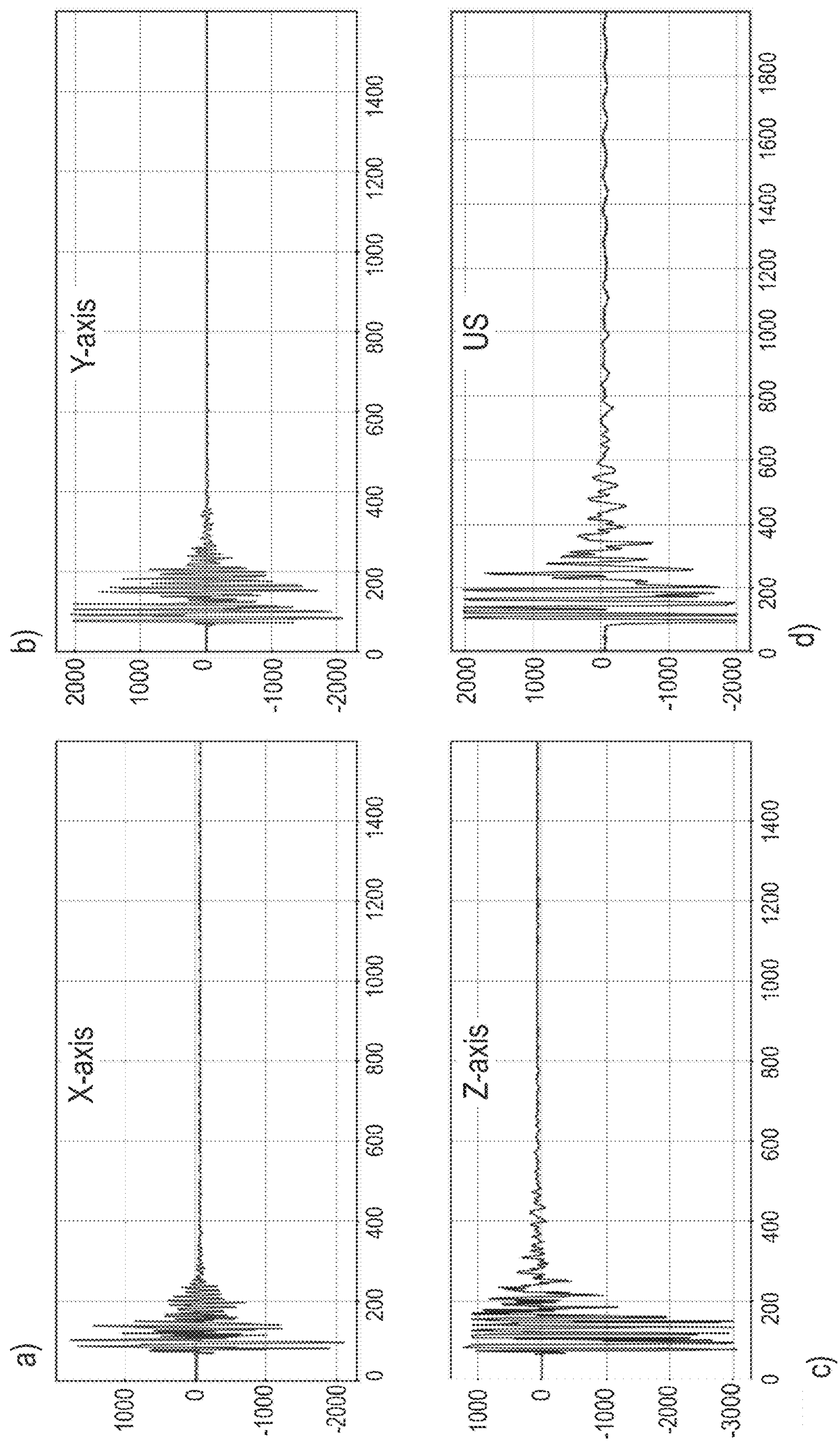
FIG. 2 illustrates characteristics of a damage on a roof.

FIG. 2 at 2*a*) to 2*c*) show an example of acceleration signals sensed along the X-axis, the Y-axis and the Z-axis. It can be seen that the maximum amplitude of the signals along the X-axis and the Y-axis are not higher than 2,000 units whereas the maximum amplitude along the Z-axis reaches about 3,000 units in the negative Z-direction. Already from this result it can be concluded that a damage on the roof 14 of the vehicle 10 has occurred. To verify this result, a maximum ultrasonic amplitude during the same event is determined. FIG. 2 at 2*d*) shows the corresponding ultrasonic signal and it can be seen that the first peak of the signal extends in the negative direction up to about 2,000 units. This confirms the assumption that a damage on the roof 14 of the vehicle 10 has occurred.

Figure 3:
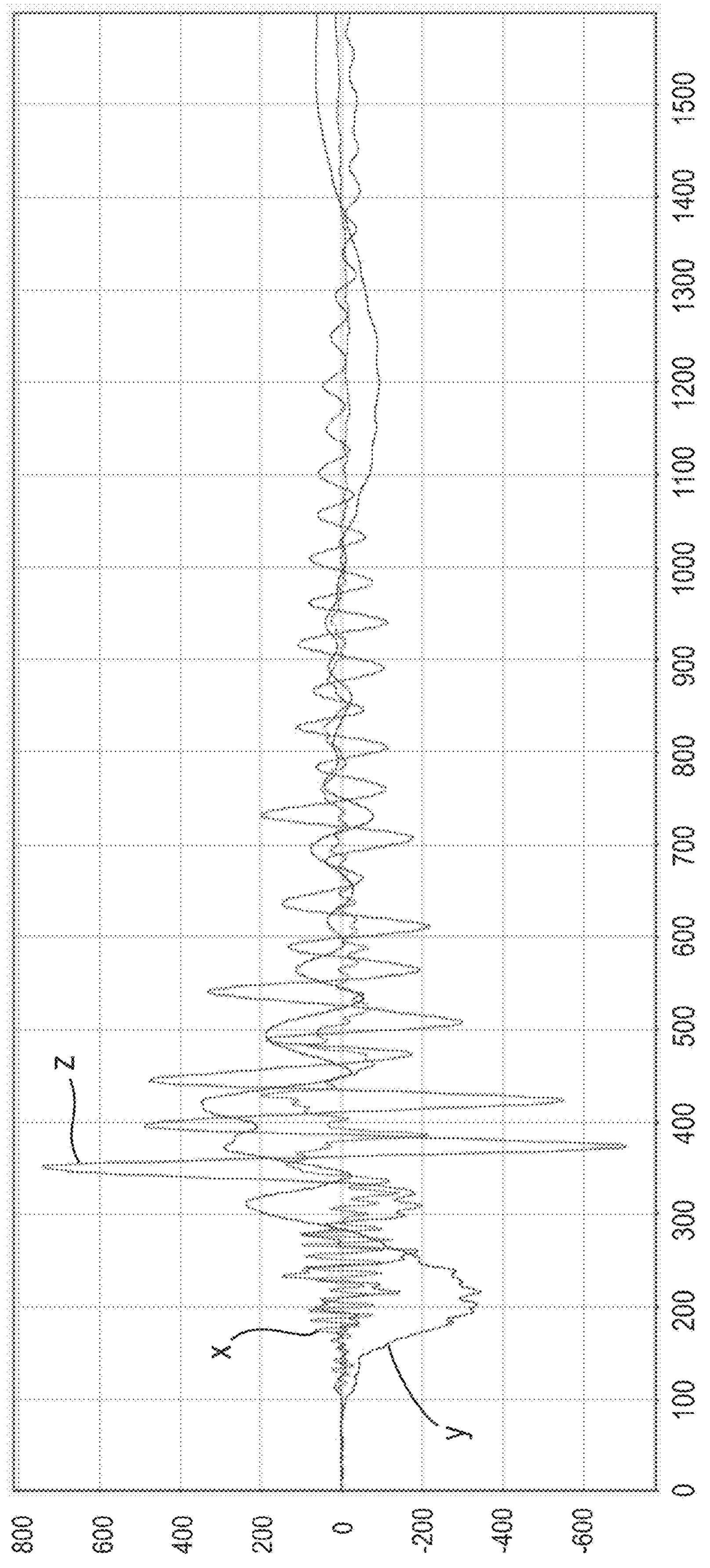
FIG. 3 illustrates characteristics of a damage on a rear bumper.

If the result of the above analysis shows that no damage on the roof is determined, it is of further interest where an impact has occurred. To facilitate the following analysis, low frequency acceleration signals are filtered out from the sensed acceleration signals, e.g. in a frequency range of 0 to 60 Hz or about 30 to 50 Hz. Thereafter, the filtered acceleration signals are evaluated to determine along what axis a peak of a filtered acceleration signal exceeds a certain preset threshold. FIG. 3 shows an example of correspondingly filtered acceleration signals, along the X-, Y- and Z-axis. It can be seen that the first peak exceeding a preset threshold of about 200 units extends along the negative Y-axis and accordingly results from a rear collision.

Figure 4:
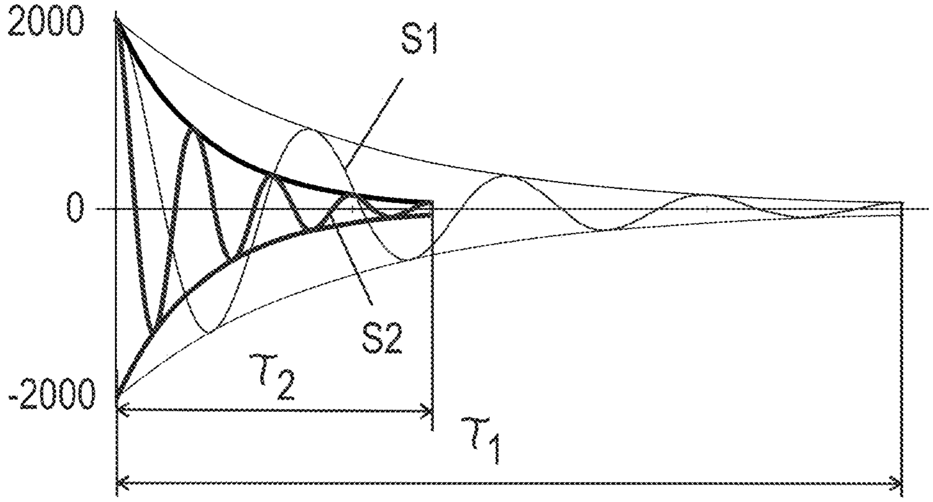
FIG. 4 illustrates a comparison of a time decay of signals resulting from a damage on metal and on glass.
Figure 5:
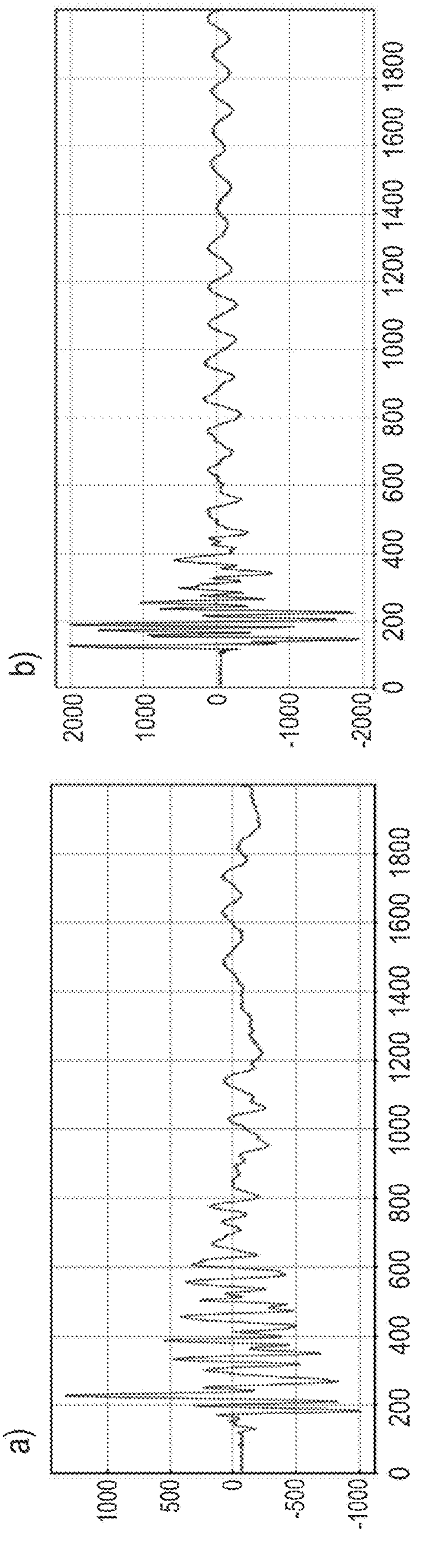
FIG. 5 illustrates characteristics of an ultrasonic signal resulting from an impact on a front bumper and a left door.

After a direction of the impact has been determined, it may be of further interest if a damage has occurred e.g. on a bumper, on a door or on a window of the vehicle 10. To determine the location of the damage, a time decay and/or the amplitude of the acceleration signals or of the ultrasonic signal can be detected to determine if a damage on metal or on another material has occurred. FIG. 4 shows an example of an acceleration signal S1 resulting from an impact on metal (in dotted line) and an acceleration signal S2 resulting from an impact on plastic. It can be seen that the time decay $\tau$1 of the signal S1 is substantially longer as compared to the time decay $\tau$2 of the signal S2. Thereby, it is possible to distinguish between an impact on metal or plastic. Similarly, it is possible to distinguish between an impact on metal or an impact on glass material and to determine the location of a damage applied e.g. to a bumper, a door or a window of the vehicle 10. FIG. 5 illustrates an example of characteristics of an ultrasonic signal resulting from an impact on a front bumper and a left door.

Figure 6:
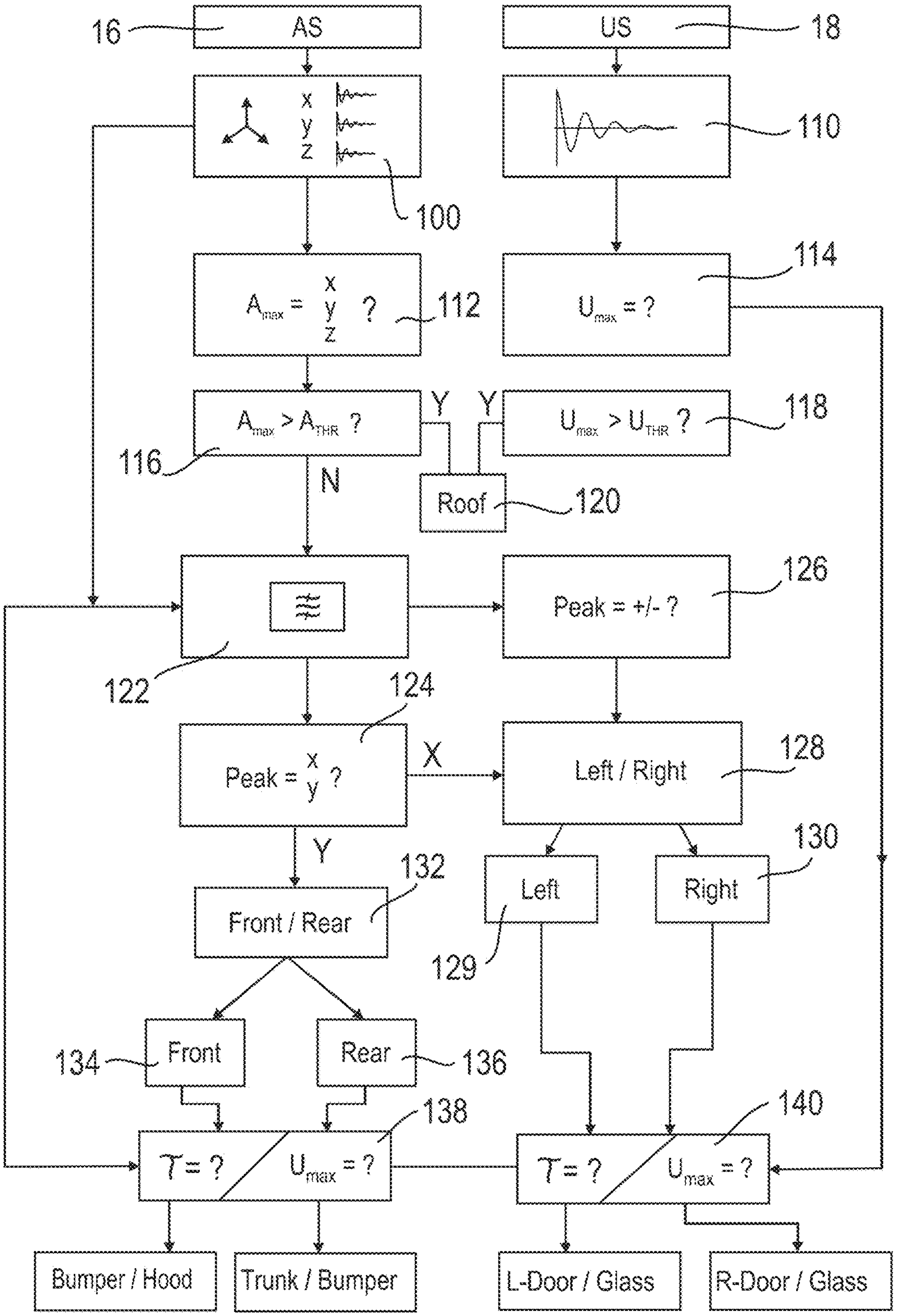
FIG. 6 is a flowchart illustrating a method of determining the location of a damage applied to a parked vehicle.

FIG. 6 shows a flowchart illustrating an example embodiment of a method of determining the location of a damage applied to a parked vehicle according to the present disclosure. In step 100 acceleration signals are sensed along the three perpendicular axes X, Y and Z by the acceleration sensor 15. Simultaneously, in step 110 the ultrasonic signal resulting from the ultrasonic sensor 13 is sensed.

In step 112 the amplitudes of the acceleration signals sensed along the axes X, Y and Z are compared and it is determined along what axis a maximum acceleration amplitude has shown. Simultaneously, in step 114 a maximum ultrasonic amplitude is determined.

At next, it is determined in step 116 if the maximum acceleration amplitude determined in step 112 exceeds a preset acceleration threshold $A_{THR}$. Simultaneously, it is determined in step 118, if the maximum ultrasonic amplitude $U_{MAX}$ exceeds a preset ultrasonic threshold $U_{THR}$. If both thresholds are exceeded, it is determined in step 120 that a damage on the roof of the vehicle 10 has occurred. If the comparisons in operations 116 and 118 show that a damage on the roof of the vehicle has not occurred, the acceleration signals of step 100 along the X- and the Y-axis are filtered out in a low frequency range of about 0 to 60 Hz at step 122. Thereafter, the first peak of these filtered signals that exceeds a preset threshold is determined and it is determined if the peak has a positive or a negative prefix in step 126. If the analysis in step 124 has revealed that the first peak exceeding the threshold has occurred in the X-direction, it is determined in step 128 that either an impact from the left or from the right has occurred. In combination with the result from step 126 it is then determined if the damage occurred on the left side (step 129) or occurred on the right side (step 130).

Similarly, it is decided in step 132 that the impact occurred from the front or rear after it has been determined in step 124 that an impact occurred along the Y-direction. Together with the result from step 126 it is determined in step 132 if a damage has occurred from a forward direction (step 134) or from a rearward direction (step 136).

At this time, the location of the impact has already been determined but it can further be determined in operations 138 and 140 if the impact was applied on a bumper, a hood, a trunk, a door or a window of the vehicle. This is performed in operations 138 and 140 by detecting a time decay of the ultrasonic signal and the acceleration signal and by evaluating the ultrasonic signal as described above.

As a result, the method allows to determine the location of a damage applied to the parked vehicle 10 and to distinguish between a damage on the roof, on a front bumper, on a rear bumper, on a hood or a trunk or on doors or windows of the vehicle.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members.

For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A system comprising:

an electronic control unit (ECU) of a vehicle, the ECU adapted to perform an anti-theft function when mounted at or adjacent a roof in a passenger's cabin of a vehicle, the ECU comprising:

at least one acceleration sensor; and at least one ultrasonic sensor including a transmitter and a receiver, wherein the ECU and the at least one acceleration sensor and the at least one ultrasonic sensor are adapted to perform the anti-theft function, wherein the at least one ultrasonic sensor detects movements within the interior of the vehicle and the at least one acceleration sensor detects any changes of an inclination of the vehicle; and a non-transitory computer readable medium comprising instructions that when executed by the ECU cause the ECU to:

sense, by the at least one acceleration sensor, acceleration signals along three perpendicular axes (X, Y, Z) and sense, by the at least one ultrasonic sensor, an ultrasonic signal;

determine characteristics of the acceleration signals and the ultrasonic signal; and determine where damage on the vehicle has occurred by evaluating a time decay of at least one of the ultrasonic signal or the acceleration signals.

2. The system according to claim 1, wherein the characteristics comprise at least one of duration, amplitude, frequency, decay time, rise time, slew rate, envelope or prefix of a signal.

3. The system according to claim 1, wherein the instructions of the non-transitory computer readable medium, when executed by the ECU, further cause the ECU to:

compare amplitudes of the acceleration signals sensed along each axis; and determine an axis that has a maximum acceleration amplitude (AMAX).

4. The system according to claim 3, wherein the instructions of the non-transitory computer readable medium, when executed by the ECU, further cause the ECU to:

determine a maximum ultrasonic amplitude;

compare the maximum acceleration amplitude with an acceleration threshold; and compare the maximum ultrasonic amplitude with an ultrasonic threshold.

5. The system according to claim 4, wherein it is determined by the ECU that a damage on a roof of the vehicle has occurred if the maximum acceleration amplitude exceeds the acceleration threshold and the maximum ultrasonic amplitude exceeds the ultrasonic threshold.

6. The system according to claim 5, wherein the instructions of the non-transitory computer readable medium, when executed by the ECU, further cause the ECU to:

filter out acceleration signals having a frequency in a range of 0-60 Hz after determining that a damage on the roof has not occurred; and evaluate the characteristics of the filtered acceleration signals to determine along what axis a peak of a filtered acceleration signal exceeds a threshold.

7. The system according to claim 6, wherein the filtered acceleration signals have a frequency in the range of about 30-50 Hz.

8. The system according to claim 7, wherein evaluating the characteristics of a filtered acceleration signal comprises:

detecting a prefix of the peak; and using the prefix to determine a location of the damage.

9. The system according to claim 4, wherein at least one of the acceleration threshold or the ultrasonic threshold is a preset threshold.

10. The system according to claim 1, wherein a maximum amplitude of the ultrasonic signal is used by the ECU to determine a damage on a bumper of the vehicle.

11. The system according to claim 1, wherein a symmetry of a signal is used by the ECU to determine the location of a damage.

12. The system according to claim 1, wherein the axes are oriented in parallel to a longitudinal (Y), a transverse (X) and a height (Z) axis of the vehicle.

13. The system according to claim 1, wherein the at least one acceleration sensor comprises one acceleration sensor, and wherein the at least one ultrasonic sensor comprises one ultrasonic sensor.

14. The system according to claim 1, wherein the characteristics comprise at least one of duration, amplitude, frequency, decay time, rise time, slew rate, envelope or prefix of a signal, wherein the instructions of the non-transitory computer readable medium, when executed by the ECU, further cause the ECU to:

compare the amplitudes of the acceleration signals sensed along each axis; and determine an axis that has a maximum acceleration amplitude.

15. The system according to claim 1, wherein the instructions of the non-transitory computer readable medium, when executed by the ECU, further cause the ECU to:

evaluate a time decay of at least one of the ultrasonic signal or the acceleration signals to determine if a damage on metal or on another material has occurred;

determine a maximum amplitude of the ultrasonic signal to determine a damage on a bumper of the vehicle; and determine a symmetry of a signal to determine the location of a damage.

16. The system according to claim 1, further comprising the vehicle.

17. A non-transitory computer readable medium comprising instructions that when executed by an electronic control unit (ECU) of a vehicle cause the ECU to:

sense, by at least one acceleration sensor, acceleration signals along three perpendicular axes (X, Y, Z) and sense, by at least one ultrasonic sensor, an ultrasonic signal;

determine characteristics of the acceleration signals and the ultrasonic signal; and determine where damage on the vehicle has occurred by evaluating a time decay of at least one of the ultrasonic signal or the acceleration signals;

wherein the ECU is adapted to perform an anti-theft function when mounted at or adjacent to a roof in a passenger's cabin of the vehicle; and wherein the at least one ultrasonic sensor includes a transmitter and a receiver, wherein the ECU and the at least one acceleration sensor and the at least one ultrasonic sensor are adapted to perform the anti-theft function, wherein the at least one ultrasonic sensor detects movements within the interior of the vehicle and the at least one acceleration sensor detects any changes of an inclination of the vehicle.

18. A system comprising:

an electronic control unit (ECU) of a vehicle, the ECU adapted to perform an anti-theft function when mounted at or adjacent a roof in a passenger's cabin of a vehicle, the ECU comprising:

at least one acceleration sensor; and at least one ultrasonic sensor including a transmitter and a receiver, wherein the ECU and the at least one acceleration sensor and the at least one ultrasonic sensor are adapted to perform the anti-theft function, wherein the at least one ultrasonic sensor detects movements within the interior of the vehicle and the at least one acceleration sensor detects any changes of an inclination of the vehicle; and a non-transitory computer readable medium comprising instructions that when executed by the ECU cause the ECU to:

sense, by the at least one acceleration sensor, acceleration signals along three perpendicular axes (X, Y, Z) and sense, by the at least one ultrasonic sensor, an ultrasonic signal;

determine characteristics of the acceleration signals and the ultrasonic signal; and determine where damage on the vehicle has occurred by evaluating the characteristics of the acceleration signals and the ultrasonic signal;

wherein the instructions of the non-transitory computer readable medium, when executed by the ECU, further cause the ECU to:

sense, by the at least one acceleration sensor, acceleration signals along three perpendicular axes (X, Y, Z) and sense, by the at least one ultrasonic sensor, an ultrasonic signal;

determine characteristics of the acceleration signals and the ultrasonic signal; and determine where the damage on the vehicle has occurred by evaluating the characteristics of the acceleration signals and the ultrasonic signal; and wherein it is determined by the ECU if a damage on metal or on another material has occurred by evaluating a time decay of at least one of the ultrasonic signal or the acceleration signals.

* * * * *